United States Patent [19]

Cavallero et al.

[11] 4,307,623
[45] Dec. 29, 1981

[54] GEARBOX CONTROL ARRANGEMENT FOR A MOTOR VEHICLE

[75] Inventors: Aldo Cavallero, Collegno; Marco Bruno, Chiusa S. Michele, both of Italy

[73] Assignee: Fiat Veicoli Industriali S.p.A., Turin, Italy

[21] Appl. No.: 125,386

[22] Filed: Feb. 28, 1980

[30] Foreign Application Priority Data

May 25, 1979 [IT] Italy ................... 68125 A/79

[51] Int. Cl.³ ............... G05G 9/18; G05G 7/16; F16D 57/00
[52] U.S. Cl. .................... 74/473 R; 74/490; 180/328; 188/1 B; 188/321.11; 188/378; 192/109 D
[58] Field of Search ............ 74/473 R, 490; 188/1 B, 188/321; 180/89.14, 328; 192/109 D

[56] References Cited

U.S. PATENT DOCUMENTS

| 1,732,969 | 10/1929 | Garrett | 192/109 D |
| 2,186,797 | 1/1940 | Beattie | 192/109 D X |
| 2,445,716 | 7/1948 | Sternberg | 74/473 X |
| 3,465,851 | 9/1969 | Callegari et al. | 188/313 X |
| 3,779,575 | 12/1973 | Mazur | 188/1 B X |

FOREIGN PATENT DOCUMENTS

| 2658019 | 7/1978 | Fed. Rep. of Germany | 74/473 R |
| 523258 | 7/1940 | United Kingdom | 192/109 D |

*Primary Examiner*—Allan D. Herrmann
*Attorney, Agent, or Firm*—Sughrue, Mion, Zinn, Macpeak & Seas

[57] ABSTRACT

An arrangement for controlling the gearbox of a motor vehicle includes a manually operable control lever and a linkage connecting the lever to a gearbox control shaft projecting from the gearbox casing. In order to prevent unintentional disengagement of a selected gear due to excessive vibrations of the control shaft as the vehicle travels over rough terrain, a damper is provided to damp axial displacements of the control shaft relative to the gearbox casing.

2 Claims, 4 Drawing Figures

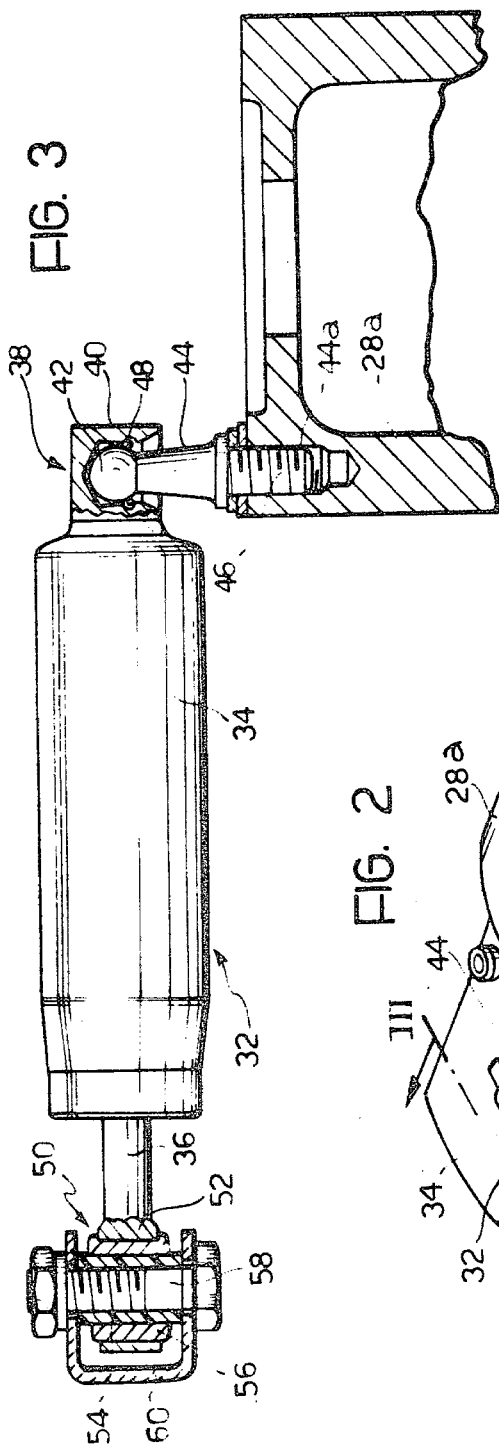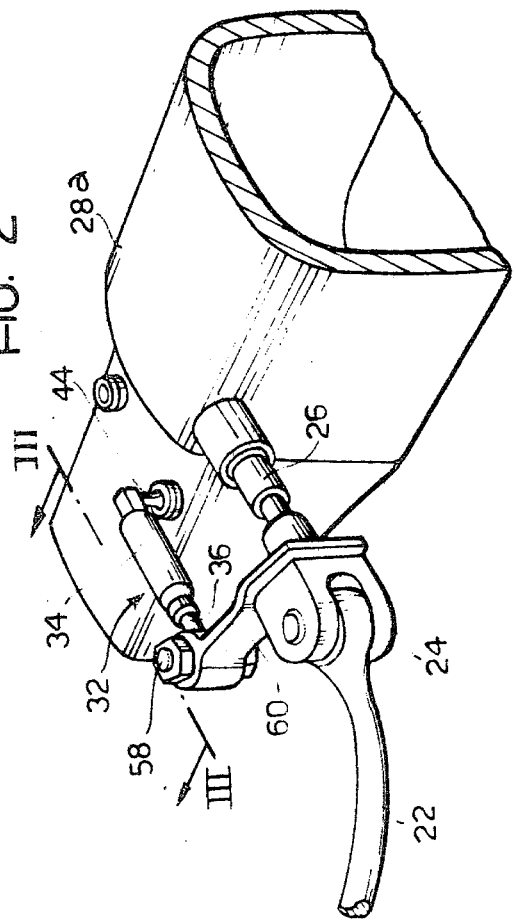

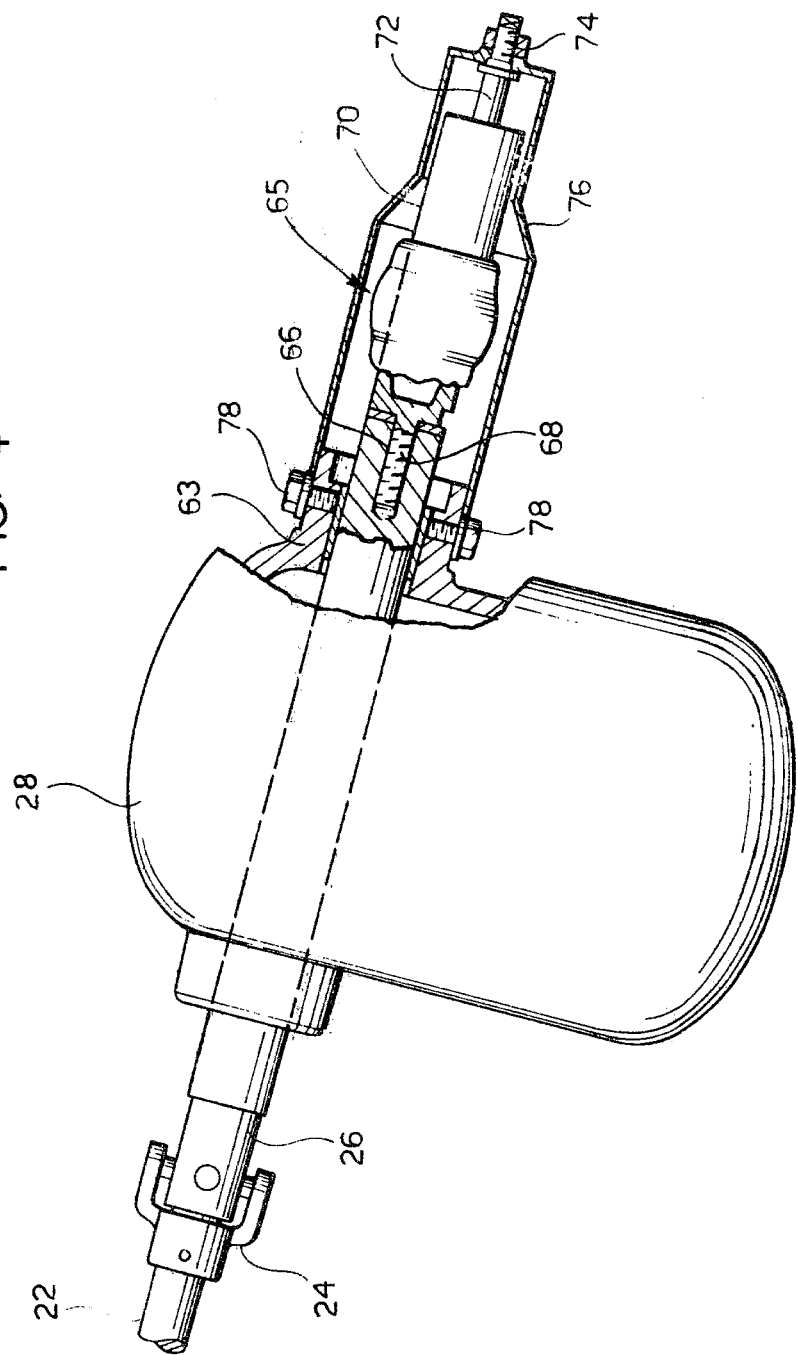

GEARBOX CONTROL ARRANGEMENT FOR A MOTOR VEHICLE

The present invention relates to an arrangement for controlling the gearbox of a motor vehicle, comprising a manually-operable control lever and a transmission linkage articulated at one end to the control lever and at the other end to a gearbox control shaft projecting from the gearbox casing.

Gearbox control arrangements of the type indicated above are generally to be found in lorries and trucks and suffer from the disadvantage that during passage of the vehicle over uneven surfaces, the gearbox control shaft can be subjected to substantial axial displacements (caused by the rapid oscillations of the control lever and transmission linkage) which can cause accidental disengagement of the selected gear.

It is an object of the present invention is to alleviate the above mentioned disadvantage in a simple, economical and practical manner.

This object is achieved in accordance with the present invention by the provision of a gearbox control arrangement of the type specified above, in which associated with the gearbox control shaft is a damper for damping axial oscillations of the control shaft with respect to the gearbox casing.

Preferably the damper is a hydrodynamic telescopic damper.

In one preferred embodiment of the invention, the damper is located externally of the gearbox casing and parallel to the control shaft, the damper including a cylinder connected by means of a ball joint to the said casing and a rod axially slidable in the cylinder, the free end of the rod being pivotally connected to a transverse bracket fixed to the control shaft adjacent its zone of articulation to the transmission linkage.

A gearbox control arrangement embodying the invention will now be particularly described, by way of example with reference to the accompanying diagrammatic drawings, in which:

FIG. 2 is a perspective view to an enlarged scale, of a detail of the gearbox control arrangement shown in FIG. 1, FIG. 3 is an enlarged sectional view on line III—III of FIG. 2; and FIG. 4 is a part-sectional view illustrating a modified form of the gearbox control arrangement.

Figure 1:
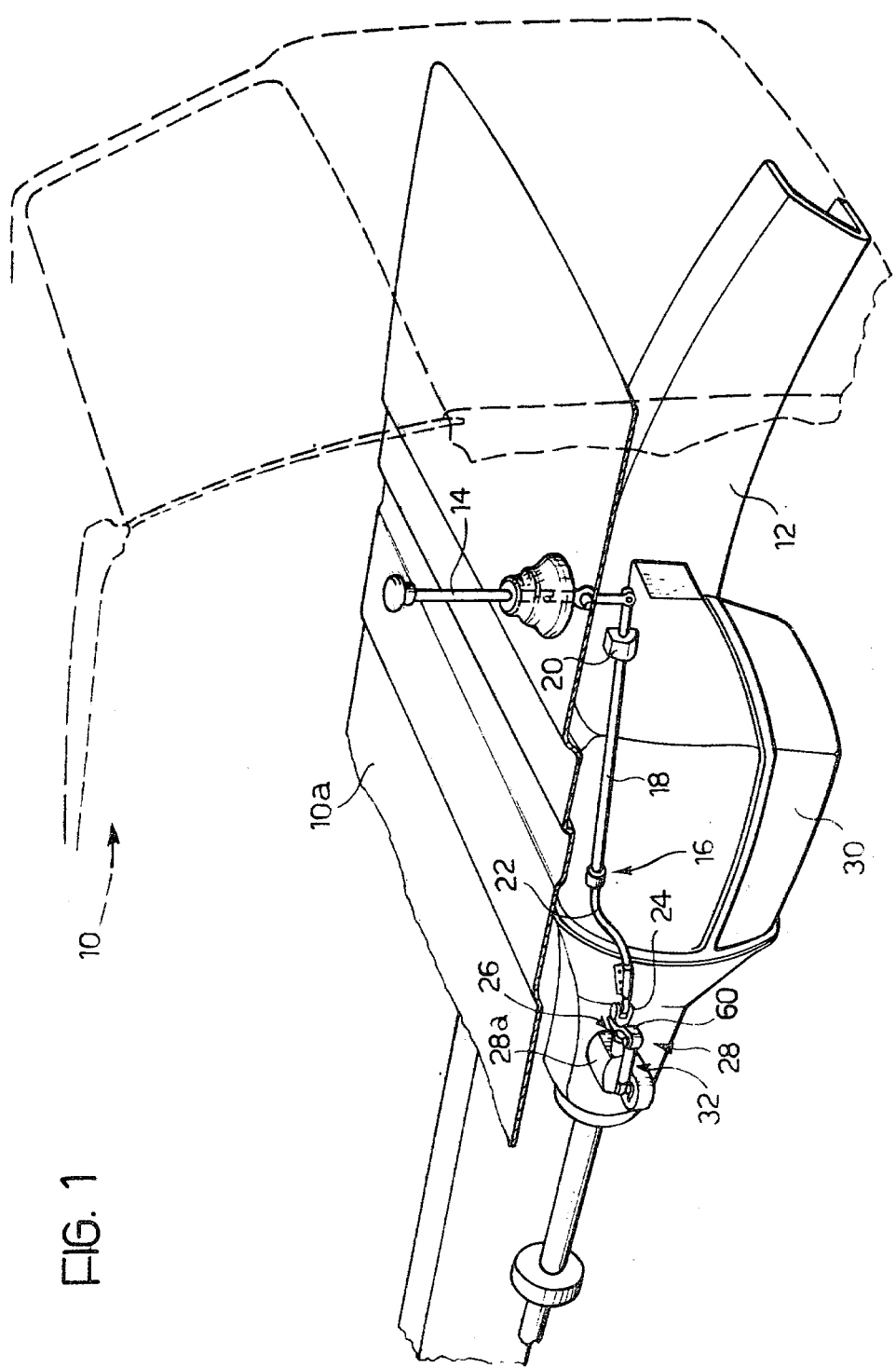
FIG. 1 is a schematic perspective view of part of a motor lorry provided with the gearbox control arrangement.

Shown in FIG. 1, is the chassis 12 and driver's cab 10 of a motor lorry or truck. The cab 10 is resiliently mounted on the chassis 12 in a manner known per se and can be tipped up to provide access to the propulsion unit 30 and gearbox of the lorry. The propulsion unit 30 is resiliently mounted on the chassis 12 in known manner and the casing 28 of the gearbox is secured directly to the propulsion unit 30.

The gearbox control arrangement includes a manually-operable rocker-type control lever 14 articulated to the floor 10a of the cab 10. The control lever 14 is articulated at its lower end to a transmission linkage 16. The first portion 18 of the transmission linkage 16 is telescopic and is provided with a hydraulic control device 20, of known type, operable to allow axial extension of the linkage portion 18 in such a way as to permit the tipping of the driver's cab 10. The second portion 22 of the transmission linkage 16 is substantially S-shaped and its end remote from the portion 18 is connected, by means of a Cardan joint 24, to one end of a gearbox control shaft 26. The control shaft 26 projects from a part 28a of the gearbox casing 28 and can be shifted within the gearbox in the direction of its longitudinal axis and rotated about the longitudinal axis, in a known manner to control the operation of the gearbox.

As is illustrated in detail in FIGS. 2 and 3, associated with the shaft 26 is a telescopic hydrodynamic damper 32 operable to damp axial oscillations of this shaft 26 in such a way as to inhibit accidental disengagement of the currently-engaged gear in the event of the lorry traversing an uneven surface. The damper 32 is of a type known per se and extends parallel to and alongside the shaft 26 externally of the gearbox casing 28. The damper 32 comprises a cylinder 34 in which a rod 36 is axially slidable. The rod 36 projects from one and of the cylinder 34 the other end of which is connected, by means of a ball joint 38, to the casing part 28a. This ball joint 38 is constituted by an element in the form of a cup 40 fixed to the cylinder 34 with its cavity facing the casing part 28a and by a spherical head 42 carried by the upper end of a post element 44. The lower end 44a of the post element 44 is threaded and is engaged in a correspondingly threaded hole 46 formed in the casing part 28a. The spherical head 42 is retained in the cavity of the cup 40 by means of a retaining ring 48.

The free end of the rod 36 of the damper 32 carries a bush 50 the axis of which is directed perpendicularly with respect to the axis of the rod 36. This bush 50 includes a rigid outer sleeve 52 the outer wall of which is connected to the end of the rod 36, an inner rigid sleeve 54, and an intermediate sleeve 56 of elastomeric material. A bolt 58 extends coaxially through the bush 50 and serves for the retention and articulation of one end of a transverse bracket 60. The bracket 60 is rigidly fixed at the opposite end to the Cardan joint 24 if the Cardan joint 24 is turned around the longitudinal axis of the shaft 26, the bracket 60 will swing in a vertical plane upwardly or downwardly. The damper 32 which is pivotally connected to the bracket 60 will also swing in the same manner since the opposite end of the damper 32 is connected to the casing 28 by means of a ball and socket joint 44 which will permit such swinging movement.

The modified form of gearbox control arrangement shown in FIG. 4 differs from that shown in FIGS. 1 to 3 in that the gearbox control shaft 26 projects from both sides of the casing part 28a and is connected to a telescopic damper 65 arranged coaxially with the shaft 26.

As can be seen from FIG. 4, one end of the shaft 26 is connected to the portion 22 of the transmission linkage by the Cardan joint 24 while the opposite end of the shaft 26, which is located on the opposite side of the casing part 28a to the Cardan joint 24, is provided with a threaded coupling 66 engaged by a spigot 68 carried on one end of the cylinder 70 of the damper 65. One end of the rod 72 is connected to an element shiftable within cylinder 70 and the other end of the rod 72 of the damper 65, carries a threaded member 74 which is fixed to the bottom of a substantially cup-shaped sheath 76 surrounding the damper 65. The open end of the sheath 76 surrounds a tubular projection 63 of the casing part 28a and is fixed to this projection 63 by means of radial bolts 78.

We claim:

1. In a motor vehicle provided with a gearbox operable by means of a control shaft projecting from the gearbox casing, a gearbox control arrangement comprising a manually-operable control lever, a transmission linkage articulated at one end to the control lever and at the other end to said gearbox control shaft projecting from the gearbox casing, and a hydrodynamic telescopic damper arranged to damp axial displacements of the said control shaft with respect to the gearbox casing, said damper being located externally of the gearbox casing alongside and parallel to said control shaft, the damper including a cylinder connected by means of a ball joint to the said casing, and a rod axially slidable in the cylinder, the end of the rod projecting from said cylinder being pivotally connected to a transverse bracket fixed to the control shaft adjacent its zone of articulation to said transmission linkage.

2. In a motor vehicle provided with a gearbox operable by means of a control shaft projecting from the gearbox casing, a gearbox control arrangement comprising a manually-operable control lever, a transmission linkage articulated at one end to the control lever and at the other end to said gearbox control shaft projecting from the gearbox casing, and a hydrodynamic telescopic damper arranged to damp axial displacements of the said control shaft with respect to the gearbox casing, wherein said control shaft projects on both sides of a part of the gearbox casing and is connected at one end to said transmission linkage and at its other end to said damper, the damper being arranged in coaxial alignment with the control shaft and including a cylinder connected at one to the control shaft and a rod axially slidable in the cylinder and projecting from the end of the cylinder remote from the control shaft, the free end of the rod being secured by means of an intermediate support element, to the gearbox casing.

* * * * *